Nov. 3, 1931.  H. C. J. H. GELISSEN  1,830,696
APPARATUS AND PROCESS FOR TREATING OXYDIC COMPOUNDS
Filed Jan. 21, 1929
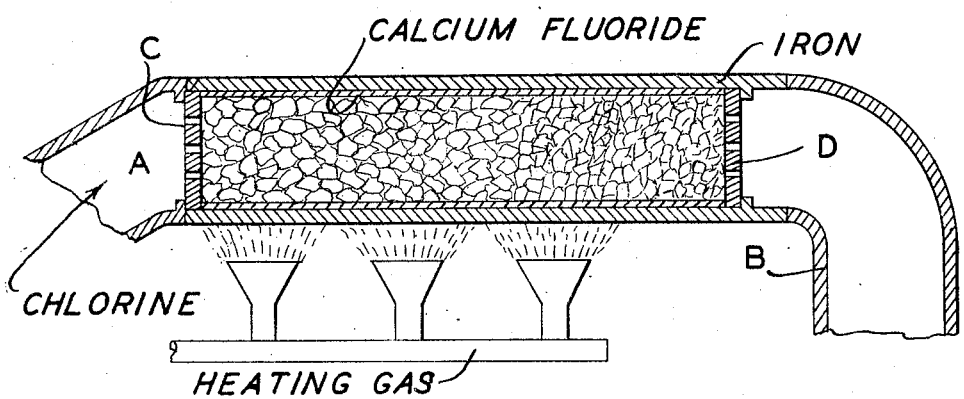
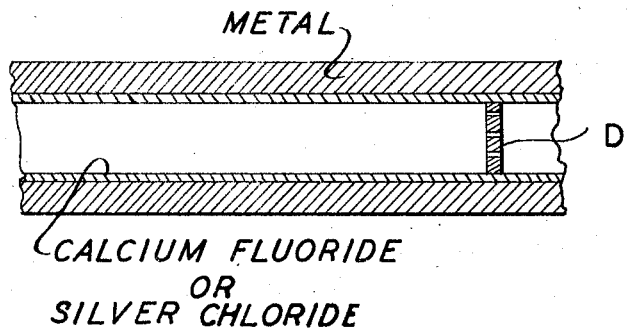

Patented Nov. 3, 1931

1,830,696

UNITED STATES PATENT OFFICE

HENRI CASPAR JOSEPH HUBERT GELISSEN, OF ROERMOND, NETHERLANDS

APPARATUS AND PROCESS FOR TREATING OXYDIC COMPOUNDS

Application filed January 21, 1929, Serial No. 334,130, and in the Netherlands January 24, 1928.

In treating oxides and salts with carbon and chlorine as in the manufacture of metal chlorides it is very difficult to find a material offering sufficient resistance to the combined action of said substances at the high temperatures employed. The materials ordinarily used such as porcelain and refractory earthenware contaminate the reaction-products as they are mostly silicates and are soon used up by corrosion; other refractory materials too such as alundum, magnesia and quartz do not offer sufficient resistance. Cast iron and special steels appear to soon lose their passivity against, for example, chlorine.

I have now found that the above drawbacks can be wholly overcome if for said treatment of oxides and especially at the combined action of carbon and halogens at a varying temperature, the apparatuses ordinarily used and which, for example, are made of iron, steel, aluminium or nickel, are provided with a layer of calcium-fluoride or silver-chloride, or if these apparatuses are wholly or partially manufactured from such material.

The thickness of the layer is chosen in connection with the violence of the reaction to be carried out in the apparatus and may vary from 0.1 to 2 millimetres.

*Example.*—A tube made of iron, which, in advance, has fully been cleaned, is covered with a plastic mass made of calcium fluoride and water, to which, if desired, a trace of clay is added. The thickness varies according to the reaction to take place and may be from 0.1 to 2 millimetres. The layer is then dried very carefully and the tube after it has been heated to 600° C. for 2 or 3 hours, is ready for use.

Calcium phosphate mixed with carbon is subjected to the action of chlorine gas, in this apparatus, at about 500° C. It was found that the tube, after several hours use, was not injured.

The annexed drawings illustrate a reaction tube made in accordance with the present invention.

Fig. 1 shows an elevation of the entire apparatus and Fig. 2 shows a section of a portion thereof.

The gas which is to be used in the reaction can enter at "A" and the vapors can be drawn off at "B" to a suitable condenser. Between the perforated refractory plates "C" and "D" the charge of material to be treated is placed. The tube is heated by suitable gas burners as illustrated. In this example the tube is shown as being made of iron lined with a layer of calcium fluoride.

In Fig. 2 the tube can be made of any suitable material preferably a metal, provided with a lining of either calcium fluoride or silver chloride as shown, and the lining may extend beyond the plate "D", and may be continued into the condenser itself if desired, as for example when the products of the reaction would corrode or otherwise injure the metal tube.

What I claim is:—

1. A process for treating compounds of the character specified with carbon and a halogen including the feature that the treatment is carried out in an apparatus which is provided with a layer of an insoluble halide, which is unaffected by such treatment.

2. A process which comprises carrying out the action of chlorine on a mixture comprising a metal compound with carbon, in apparatus of which the faces in contact with the reaction mass, are composed of an insoluble metal halide.

3. A process which comprises carrying out the action of chlorine on a mixture comprising a metal compound with carbon, in apparatus of which the faces in contact with the reaction mass, are composed of calcium fluoride.

4. An apparatus for treating compounds of the character specified with carbon and a halogen in which apparatus the faces of the apparatus in contact with the reacting mass are composed essentially of an insoluble metal halide.

5. An apparatus for treating compounds of the character specified with carbon and a halogen, such apparatus being provided with a layer of an insoluble halide.

6. An apparatus for treating compounds of the character specified with carbon and a halogen, in which apparatus the faces of the apparatus in contact with the reacting mass are composed essentially of calcium fluoride.

In testimony whereof I affix my signature.

HENRI C. J. H. GELISSEN.